Feb. 16, 1971  M. GARCIN ET AL  3,563,804
ELECTROCHEMICAL CELL WITH TERMINALS HAVING CONDUCTIVE OR
INSULATING BLOCKS INTERPOSED
Filed June 18, 1968  4 Sheets-Sheet 3

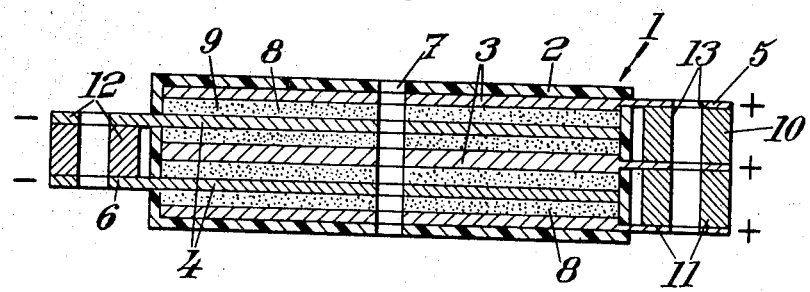
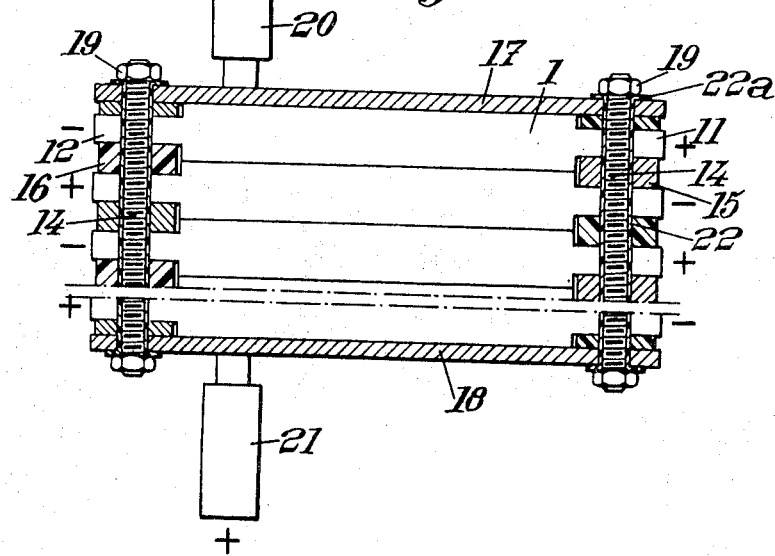
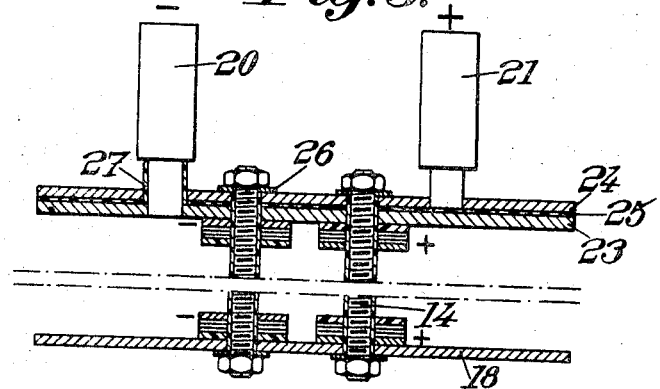

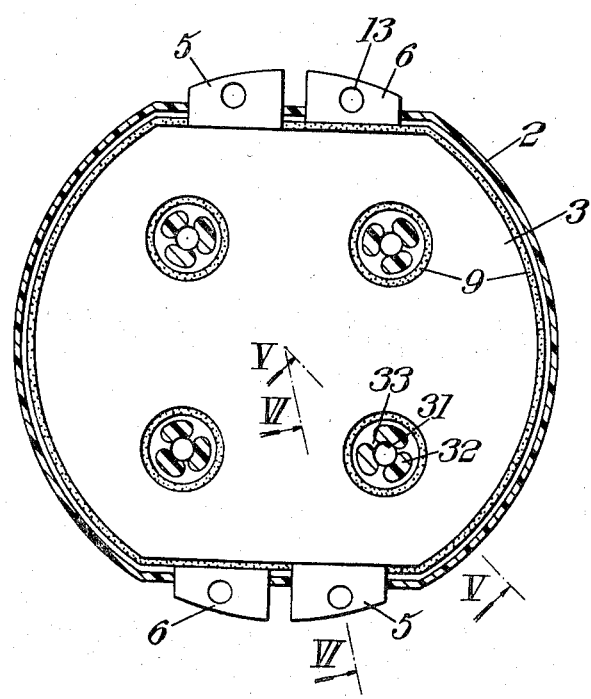
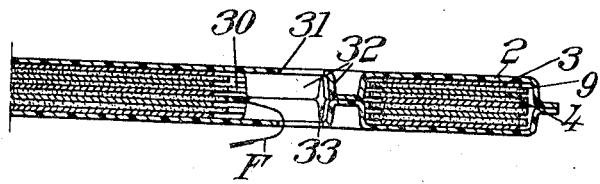
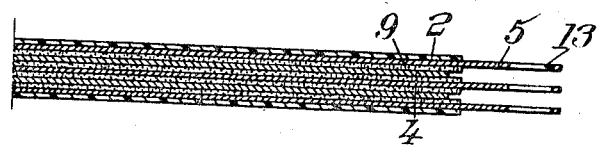

INVENTORS
MAURICE GARCIN
JEAN ROUSSET
BY
William D. Stokes
ATTORNEY

INVENTORS
MAURICE GARCIN
JEAN ROUSSET
BY William D. Stokes
ATTORNEY

United States Patent Office 3,563,804
Patented Feb. 16, 1971

3,563,804
ELECTROCHEMICAL CELL WITH TERMINALS HAVING CONDUCTIVE OR INSULATING BLOCKS INTERPOSED
Maurice Garcin and Jean Rousset, Paris, France, assignors to Societe Les Piles Wonder, Saint-Ouen, France
Filed June 18, 1968, Ser. No. 738,068
Claims priority, application France, June 22, 1967, 111,515
Int. Cl. H01m 17/00
U.S. Cl. 136—100                                     8 Claims

ABSTRACT OF THE DISCLOSURE

This electrochemical battery is primable with sea water. It comprises flat elements, each formed by a capsule of plastic material containing several positive electrode plates connected to a common positive terminal, several negative electrode plates connected to a common negative terminal and intercalated sheets of absorbent paper. These elements are piled on rods passing through the terminals with the interposition of blocks, appropriatively conductive or insulating. These rods are fixed by screwing in the manner of tie-rods on two end plates.

---

The present invention relates to electrochemical batteries, in particular of the primable type, that is to say of the type which do not contain electrolyte in the usual state of non-operation or of storage, but which are arranged so that the necessary electrolyte can be introduced or generated at the time of priming and during operation.

The invention is more particularly concerned with batteries primable with water and preferably with sea water.

An object of the present invention is to provide batteries of this type which fulfill the requirements of practice, notably with respect to the simplicity and the flexibility of their manufacture as well as their longevity and robustness.

The basic battery to which the improvements according to the present invention are to be made comprises an ensemble of flat unitary electrochemical elements piled on one another and each comprising, in a capsule of an electrically insulating material, liquid-tight with respect to the electrolyte, at least one positive electrode plate and at least one negative electrode plate maintained spaced apart one from the other, the plates of each polarity of this element each comprising a lug projecting out of the capsule and forming an exterior electrical connection terminal for the element, means being provided for making each volume comprised between two successive electrode plates of opposite polarity of this element communicate with the exterior of the capsule.

According to the improvements forming the subject matter of the present invention, the basic battery defined above comprises in addition at least one rod passing through a succession of terminals of the piled electrochemical elements, with the interposition of blocks of suitably chosen thicknesses, electrically insulating or conductive, between these successive terminals, according to the electric mounting (in series or in parallel) desired for these elements, this rod being fixed in the manner of a tie-rod, in particular by screwing, on two rigid pieces disposed at the two ends of the battery so as to ensure both a solid mechanical assembly of the piled elements and an excellent electric connection between the conductive blocks and terminals in contact, this rod also being able to ensure an electrical connection between said two rigid pieces.

In particular, each of the electrochemical elements of a battery of the type in question can be formed by a pile of alternately positive and negative electrode plates maintained spaced apart from one another, notably by cushions absorbent with respect to the electrolyte, this pile, housed in the capsule of the element, being provided with cavities passing through the pile in the direction of the piling, these cavities being accessible by the electrolyte from the exterior of the capsule through relatively small orifices pierced opposite them in the walls of this capsule, the zones of these walls which surround these orifices, being embossed locally so that the opposing embossed surfaces belonging respectively to the two wall zones which close a common cavity penetrate into this cavity until they come into mutual contact, whereby, on the one hand, they maintain the two walls spaced apart, and on the other hand, they create channels of reduced cross section for the electrolyte.

The invention will be easily understood from the following specific description, given merely by way of example, with reference to the accompanying drawings, in which:

FIG. 1 shows schematically in axial section an element of a battery according to the invention;

FIGS. 2 and 3 show schematically in axial section two variants of batteries according to the invention;

FIGS. 4, 5 and 6, show, respectively in end view, with parts removed, and in enlarged sections along V—V and VI—VI of FIG. 4, an embodiment of a battery element according to the invention;

Figure 7:
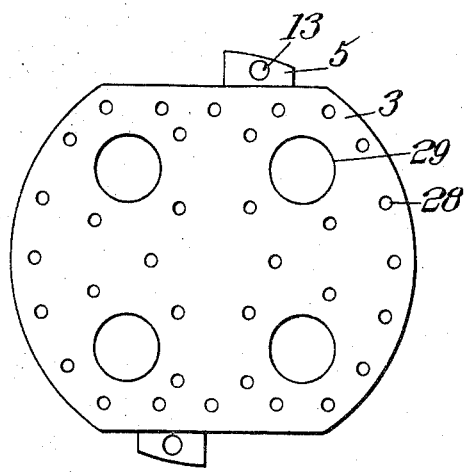
FIGS. 7, 8 and 9 show, respectively, three constituent pieces of this element.
Figure 8:
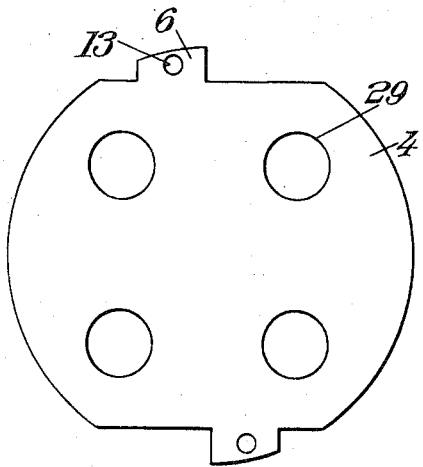
Figure 9:
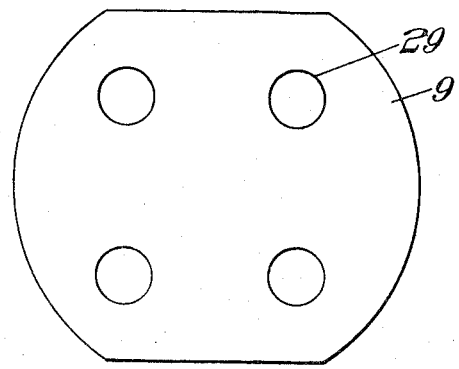

The electrochemical batteries which will now be described are primable with sea water, and are especially robust, durable, economic and convenient to use.

Such a battery comprises, as a whole, a pile of flat elements 1.

Each of these elements comprises, in a capsule 2 (FIG. 1) of an electrically insulating material which is non-porous with respect to the electrolyte, at least one positive electrode plate 3 and at least one negative electrode plate 4 maintained spaced apart from one another, each of these electrodes comprising an electrical connection lug (respectively 5, 6) projecting out of the capsule; passages 7 are reserved in the wall of this capsule to provide for the passage of the electrolyte from the exterior into the volumes 8 comprised between neighbouring electrodes of opposite polarities.

Such a flat element has for example been described in French first patent of addition No. 87,932 filed in the name Société Les Piles Wonder on May 19, 1965 and delivered on Sept. 26, 1966; in that patent of addition, the capsule was notably constituted by two half-cups or half-shells in polyvinyl chloride welded along their peripheral edges by high frequency, the positive electrodes were constituted by active layers of silver chloride deposited on sheets of silver and the negative electrodes were constituted of magnesium.

In the present case, the spacing between the electrodes, instead of being ensured by bolts of plastic material as in that patent of addition, is ensured by means of cushions 9 absorbent with respect to the electrolyte, for example of paper, disposed in the volumes 8.

Moreover, the number of electrodes is, in the present case, relatively high: in the unitary element 1 shown schematically in FIG. 1, there can be seen two positive electrodes with one active face, one positive electrode 3 with two active faces and two negative electrodes 4 with two active faces, which forms a total of four cells, and the connection lugs (5 and 6) of the same polarity are interconnected perpendicularly to the mean planes of the electrodes by conductive blocks 10, notably of silver.

Thus each flat element 1 comprises a certain number of sub-elements or cells mounted electrically in parallel with common output terminals 11 and 12 each formed by several connection lugs electrically interconnected.

The interconnected lugs and the connection blocks interposed between these lugs are provided with holes 13 disposed opposite one another in the direction of piling (which direction will be called the "axial direction" in the rest of the description).

The flat unitary elements 1 thus formed are piled on one another by threading of rods 14 through their output terminals 11, 12 with the interposition of appropriate blocks 15 of electrically conductive material (for example of silver) or 16 of electrically insulating material (for example of plastic material) according to the electrical mounting desired.

In the embodiment illustrated in FIG. 2, the various piled flat elements are electrically mounted in series: for this purpose the successive terminals threaded on a common rod 14 are alternately positive and negative and each positive terminal of an intermediate element is electrically connected to the negative terminal of one of the two elements which are contiguous with it (for example to the negative terminal of the element immediately below, in the case of the vertical pile of FIG. 2) and on the contrary electrically insulated from the negative terminal of the other contiguous element immediately above in FIG. 2.

At the two ends of this pile of elements, the rods 14 pass respectively through two rigid conductive plates 17 and 18 and are fixed on these plates in the manner of tierods, preferably by screwing nuts 19 on their ends which are threaded for this purpose, which ensures both a solid mechanical assembly of the piled elements and an excellent electrical connection between the conductive blocks and terminals in contact.

The choice of the thickness of the conductive and insulating blocks, which determines the quality of the electrical contacts between elements, also has the consequence of permitting precise adjustment of the distance separating the positive and negative electrodes at the interior of each element.

In the embodiment of FIG. 2, one of the plates 17 is electrically connected to the negative terminal 12 of an end element 1 of the pile and the other plate 18 is electrically connected to the positive terminal of the other end element, and conductive contact studs 20 and 21 mounted respectively on these two plates permit the electrical connections to be ensured between the battery and the exterior circuit to be supplied with electric current.

In this embodiment, the rods 14 only ensure a mechanical role: if they are of metal, they are surrounded by an insulating sheath 22 provided at its ends with flanges 22a interposed between the nuts 19 and the plates.

The number or rods 14 is at least equal to two, since the number of output terminals of each element 1 is at least equal to two.

Although it is preferable to provide complete holes, that is to say having a closed contour, in the terminals and blocks, in certain cases they can be replaced by notches accessible laterally by the rods, such a solution facilitating the assembling and the dismantling of the battery.

The variant illustrated in FIG. 3 differs from that of FIG. 2 in that the two contact studs 20 and 21 of the battery are disposed at the same end of this battery.

For this purpose, one of the plates 17 is replaced by two rigid plates 23 and 24 of conductive material juxtaposed one against the other while being electrically insulated one from the other by a sheet of insulating material 25.

The end positive and negative terminals of the pile are connected respectively to the end plate 18 and to the intermediate plate 23 and the rods 14 electrically connect the two end plates 18 and 24 to each other while still ensuring, of course, the mechanical cohesion of the ensemble, the insulating flanges 22a of the previous construction being here replaced by conductive washers 26. One of the contact studs 21 is here mounted on the end plate 24 whereas the other 20 is mounted on the intermediate plate 23 and passes through the plate 24 at the interior of an insulating ring 27.

Referring to FIGS. 4 to 9, an embodiment will now be described in more detail of a flat element 1 of the circular type established according to the indications given hereafter.

In this element the capsule 2 is again formed of two half-capsules welded at their peripheries, this capsule containing a pile of alternate positive 3 and negative 4 electrode sheets, with the interposition of absorbent sheets 9.

The connection lugs 5 and 6, perforated at 13, project out of the capsule, each electrode sheet comprising two diametrically opposed lugs; the ensemble of each sheet and of its two lugs has the general form of a circle notched on each side of these lugs.

The positive electrodes 3 (FIG. 7) comprise, for example, sheets of silver on at least one of the faces of which is an active layer of silver chloride except in the region of the connection lugs. These electrodes are perforated with small holes 28 permitting among other things the acceleration of the diffusion of the electrolyte during priming.

The negative electrodes 4 (FIG. 8) are, for example, made of magnesium or of zinc.

The intercalated absorbent layers 9 (FIG. 9) comprise, for example, one or several sheets of paper.

The various sheets 3, 4 and 9 are provided with relatively large holes 29 which, after piling, are disposed axially opposite one another and form cavities 30 (FIG. 6) passing through the pile from one end to the other.

The walls of the capsule 2 are provided, opposite the centres of these cavities 30, with small holes 31 adapted to provide for the passage of the electrolyte.

The zones of these walls which surround these holes 31 are embossed in a manner to form bosses 32 which penetrate into the cavities 30.

The opposing bosses 32, embossed respectively in the two parts of the capsule which limit axially the same cavity 30, come into mutual contact two by two (FIG. 5) and are welded one against the other at the same time as the peripheries of the half-capsules.

These bosses 32—which have, for example, the general form of three beans surrounding each hole 31—have a double effect:

On the one hand, they contribute to the maintenance of the relative spacing of the two parallel walls of the capsule, thus opposing excessive crushing of the intercalated absorbent sheets, On the other hand, they delimit between themselves channels 33 of reduced cross section for the passage of the electrolyte.

As the diameters of the holes 31 are smaller than the diameters of the holes 29 (or of the cavities 30), the electrolyte is obliged to follow a relatively long path—such as shown schematically by the arrow F in FIG. 5—to pass from the active zones of one element to the active zones of opposite polarity of the contiguous elements, which decreases the magnitude of possible leakage currents.

When the flat elements 1 of the type which have just been described are piled, they are guided transversely by the rods 14 which pass through their lugs 5 and 6, which positions very exactly the various holes 31 axially opposite one another.

Figure 10:
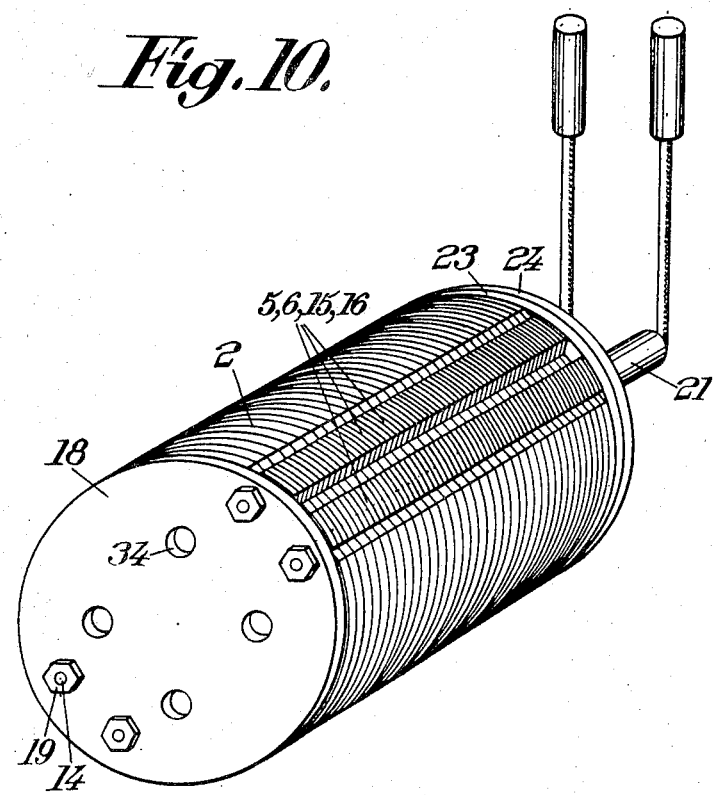
FIG. 10 shows, in perspective view, a battery formed with such elements.

The channels formed by each axial succession of these holes are extended by other holes 34 (FIG. 10) provided in the end plates.

Thus the conduits provided have a relatively small interior volume for the electrolyte: this volume is hence very quickly filled by the electrolyte as soon as the battery is immersed in this electrolyte, which ensures very rapid priming of this battery.

Similarly, due to this small volume of electrolyte, the leakage currents are reduced, and if this electrolyte circulates permanently, the undesirable products (gaseous or not) possibly formed in the course of the chemical reactions are rapidly evacuated by it.

The battery can also be primed by simple introduction of the electrolyte into the conduits in question, and not necessarily by immersion.

To isolate the unitary elements 1 from each other after use of the battery, it is sufficient to introduce in each of the conduits in question electrically insulating cylindrical bars, for example of plastic material, of the same diameter as the orifices 31 and at least as long as the axial dimension of the pile.

Or again, if it is desired to form a certain reserve of electrolyte in the battery in order to maintain the unitary electrochemical elements irrigated during a possible emersion of the battery out of the electrolyte, it is sufficient to block off the holes 34 by means of appropriate plugs.

It should be noted that the collection of the currents, even of high value, delivered by the batteries thus constructed is ensured in excellent conditions, since the circulation of these currents in the terminals and blocks in contact is perpendicular to the junction surfaces of these terminals and blocks and parallel to the direction of gripping exerted on them by the rods 14.

The ensemble of the battery can be protected by coating with an electrically insulating material, for example with a resin of the araldite type.

Figure 11:
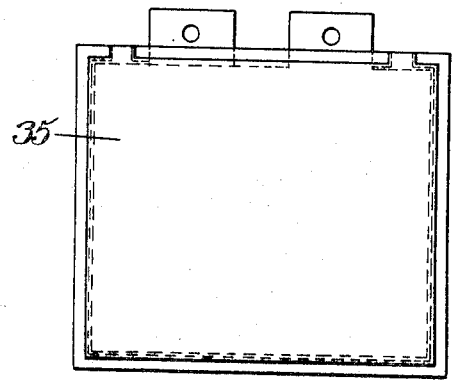
FIG. 11 shows schematically in lateral view another battery according to the invention.

Needless to say, many variations of the particular embodiments described are possible, such as, for example:

Variations in which the various at elements have a general form other than circular, for example rectangular as shown at 35 in FIG. 11, Variations in which the introduction of the electrolyte is made through the periphery of the elements as shown in FIG. 11, Variations in which at least some of the unitary elements 1 are electrically mounted in parallel instead of being mounted in series during their piling.

In view of the wide range of variations possible without departing from the spirit or scope of this invention, the invention should not be limited to the particular embodiments which have been described merely by way of example.

What we claim is:

1. An electrochemical battery, which is primable with an electrolyte, comprising
   a plurality of flat electrochemical elements piled on one another, each said element comprising
     a capsule of electrically insulating material, liquid-tight with respect to the electrolyte,
     at least one positive electrode plate and at least one negative electrode plate disposed in said capsule in spaced apart relationship,
     the electrode plates of each polarity of said element each comprising a lug projecting out of said capsule and forming an exterior electrical connection terminal for said element, and
     a plurality of communicating passageways passing through said insulating material and said electrode plates, freely communicating with the passageways in other of said elements, and
   wherein said battery comprises blocks interposed between successive terminals, said blocks comprising some conductive blocks for series connection and all conducting blocks for parallel connections,
   and at least one rod passing through these successive terminals, said rod being electrically insulated from the plates and being fixed in the manner of a tie-rod on two rigid pieces disposed at the two ends of the battery so as to assure both a solid mechanical assembly of the piled elements, and tight contact between the conductive blocks and adjacent terminals, this in turn providing a close electrical connection.

2. A battery according to claim 1, comprising a plurality of said rods which are parallel with one another and fixed by screwing on said rigid end pieces.

3. A battery according to claim 2, wherein said rods provide an electric connection between said two end pieces, and said battery has a positive contact stud and a negative contact stud, one of said two contact studs being electrically connected to one of said two end pieces, and the other of said two contact studs being electrically connected to another piece which is at least partially conductive and which is disposed on the interior side of said one end piece while being electrically insulated from said one end piece, said one end piece and said other piece comprising two parallel plates electrically insulated one from the other by an insulating sheet, said one end piece being provided with a passage for the contact stud connected to said other piece.

4. A battery according to claim 2, wherein each said element comprises a pile of alternately positive and negative electrode plates maintained spaced apart from one another, said pile, which is housed in the capsule of said element, comprising cavities passing therethrough in the direction of piling of said electrode plates, said cavities being accessible by the electrolyte from the exterior of said capsule through relatively small orifices provided in the walls of said capsule opposite said cavities, the zones of said walls which surround said orifices being embossed locally so that the opposing embossed surfaces belonging respectively to the two wall zones which close a common cavity penetrate into said cavity until they come into mutual contact, whereby, on the one hand, they maintain said two walls spaced apart, and on the other hand, they create channels of reduced cross section for the electrolyte.

5. A battery according to claim 4, wherein the coacting electrode plates are maintained spaced apart by cushions which are absorbent with respect to the electrolyte.

6. A battery according to claim 4, wherein said end pieces are provided with holes axially opposite said channels formed by the cavities of the various piled elements.

7. A battery according to claim 1 comprising some insulating blocks and some conductive blocks disposed in a manner to provide a series connection of said electrode plates.

8. A battery according to claim 1 wherein said blocks are conductive blocks disposed in a manner to provide a parallel connection of said electrode plates.

References Cited
UNITED STATES PATENTS

| | | | |
|---|---|---|---|
| 478,485 | 7/1892 | Waldron | 136—17 |
| 2,699,459 | 1/1955 | Blake et al. | 136—100M |
| 3,156,586 | 11/1964 | Solomon et al. | 136—100 |
| 3,177,099 | 4/1965 | Kirk et al. | 136—100M |
| 3,279,951 | 10/1966 | Bowers et al. | 136—100 |
| 3,413,151 | 11/1968 | Adams et al. | 136—83 |
| 3,432,350 | 3/1969 | Wilson | 136—100M |

WINSTON A. DOUGLAS, Primary Examiner

C. F. LeFEVOUR, Assistant Examiner

U.S. Cl. X.R.

136—83